United States Patent [19]

McClenny

[11] 4,164,339
[45] Aug. 14, 1979

[54] ENVIRONMENTAL PROTECTION SYSTEM

[76] Inventor: Carl O. McClenny, 6154 Willer's Way, Houston, Tex. 77057

[21] Appl. No.: 854,753

[22] Filed: Nov. 25, 1977

Related U.S. Application Data

[63] Continuation of Ser. No. 367,321, Jun. 6, 1973, abandoned.

[51] Int. Cl.$^2$ ............................................. B64G 1/10
[52] U.S. Cl. ............................................ 244/163; 102/105; 244/117 A
[58] Field of Search ............... 244/163, 117 A, 158, 244/160, 173, 218, 130, 121, 113; 102/105, 37.1; 62/DIG. 5; 165/41, 44; 252/62; 89/36 R, 36 L, 36 Z; 160/98, 238; 242/67.3 R; 52/401

[56] References Cited

U.S. PATENT DOCUMENTS

| | | | |
|---|---|---|---|
| 1,265,071 | 5/1918 | Flint | 242/67.3 R |
| 2,328,263 | 8/1943 | De Stefano | 160/98 X |
| 2,540,331 | 2/1951 | Hlavaty | 165/44 X |
| 2,774,421 | 12/1956 | Lion | 160/238 |
| 2,874,612 | 2/1959 | Luboshez | 160/238 X |
| 3,152,548 | 10/1964 | Schwartz | 102/105 |
| 3,176,933 | 4/1965 | Clemmons | 244/163 |
| 3,184,187 | 5/1965 | Isaac | 244/173 |
| 3,289,974 | 12/1966 | Cohen et al. | 244/162 |

Primary Examiner—Barry L. Kelmachter

[57] ABSTRACT

Sheets of metal foil superalloy heat-resisting metal foil, aluminized mylar or other thermal insulators are superposed one upon the other and deployed over the surface to be protected. A "dead space" thermal insulation such as a vacuum or simply a high resistance physical separation, is provided between surfaces. Physical separation between surfaces may be effected by flaps, integral to the insulator material, which are actuated by an aerodynamic or forced airstream or by the static energy stored in uncoiled flaps. Deployment is effected, only when needed, either by automatic or manually controlled reels which dispense the insulating material.

4 Claims, 12 Drawing Figures

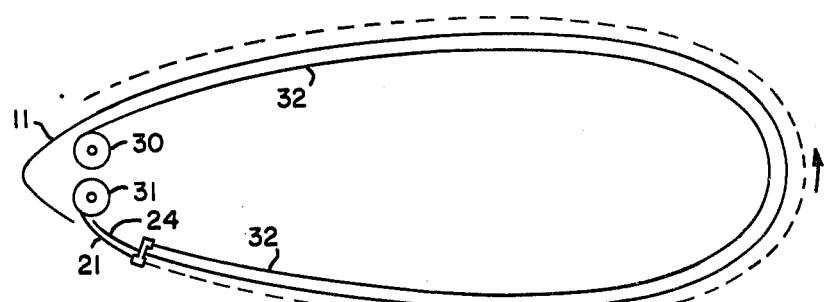
FIG. 3
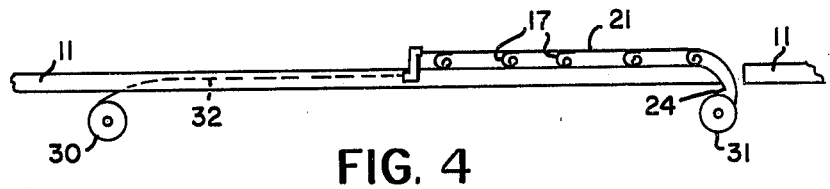
FIG. 4
FIG. 5
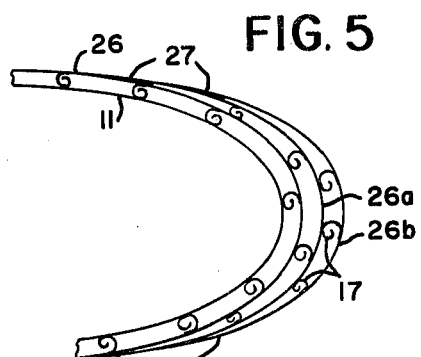
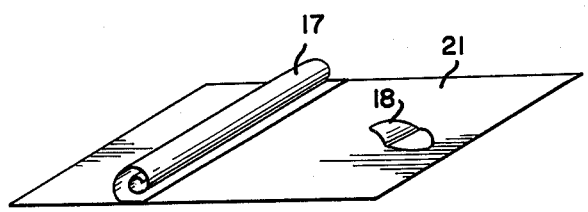
FIG. 6
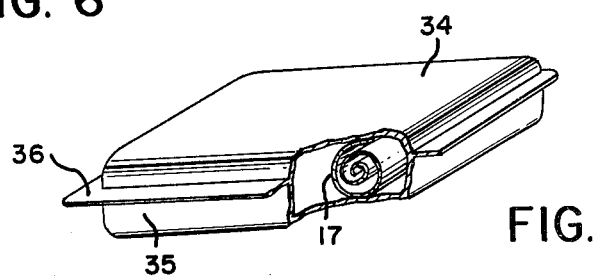
FIG. 7 ns. 4,164,339

ENVIRONMENTAL PROTECTION SYSTEM

This is a continuation of application Ser. No. 367,321, filed June 6, 1973 now abandoned.

BACKGROUND OF THE INVENTION

1. Field of the Invention

The invention pertains to insulation, particularly to thermal insulation with spacecraft applications, in which a stand-off means is employed to obtain physical separation, and direct bonding of the insulating material to the surface to be protected is not required.

2. Description of the Prior Art

Tremendous heat loads are encountered by spacecraft during orbit or trans-celestial flight due to solar energy. Likewise, during reentry of a spacecraft to earth environment, heat loads build up due to aerodynamic friction. Previous methods of solving these problems have resulted in ablative materials for the reentry environment, and rotation (such as in a rotisserie) of the spacecraft for the solar energy heat problems. Previous ablative heatshields have incorporated a honeycombed matrix filled with ablative material bonded to a substrate, an ablative material impregnated carpet adhesively bonded to a substrate, and a high temperature-resistant fiber carpet with pile extending from either side of the fabric base. See U.S. Pat. Nos. 3,603,260, 3,250,661, and 3,349,814.

While these devices solve most of the temperature problems, they nevertheless exhibit the disadvantages of excess weight, high cost, complexity of installation and non-reusability. Of ment of a mechanical bond between the thermal protection and the spacecraft surface to be protected.

SUMMARY OF THE INVENTION

The present invention employs a layer or plurality of layers of temperature-resistant metal foil, aluminized mylar or the like, in which means are employed to provide a standoff capability thereby effecting a physical separation and resultant low thermally conductive "dead" spaces between the surfaces. Aerodynamically or mechanically-operated flaps may be utilized to provide the "stand-off" or spacing between surfaces. In a preferred embodiment, the spacing is provided by uncoiled flaps which, when unrestrained, roll up due to the stored mechanical energy in the coils. The thermal protection system may be deployed automatically by aerodynamic friction, by motor-operated pulley schemes, or simply by astronaut extra-vehicular deployment.

DESCRIPTION OF THE DRAWINGS

FIGS. 3, 4, and 5 illustrate various methods of deploying the invention by driven means.

FIG. 5 also illustrates another form of the invention particularly suited for providing leading edge protection.

FIG. 6 shows further detail of the coil and flap elements.

FIG. 7 shows a final embodiment of the invention.

DESCRIPTION OF THE PREFERRED EMBODIMENTS

Figure 1A:
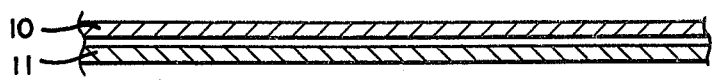
FIGS. 1a—1d illustrates side elevation views of several forms of the invention.
Figure 1B:
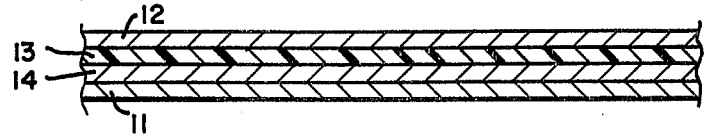

The present invention consists of a sheet or sheets of metal foil, preferably, in some applications, superalloy heat-resisting metal foils, such as Inconel, TD nickel-chromium alloys, and nickel base alloys containing tungsten, aluminum, zirconium and carbon, in which means are employed to provide a "dead space" thermal insulation between the surfaces thereof and the surfaces to be protected. The foil is mounted, during storage, in compact rolls and is deployed by the methods described hereinafter across the surfaces to be protected. The foil may be of any one or more of the configurations shown in FIG. 1 and may be made of materials such as aluminized mylar. A layer of insulation, such as asbestos, may be included between foil layers.

The heart of this system is the scheme of layering, or superposing, the foil with thermally-insulating blankets and/or spaces separating them. The separation may be achieved by several means including: (1) multiple flap elements (see element 18 in FIGS. 1c and 6) which are folded back over one layer of foil by the atmospheric stream flowing over its surface; and/or (2) self-actuated coils 17 which are extended (superposed) along the surface of the foil, when in the stowed configuration of a tightly compressed roll of foil, and which coil up as the foil is reeled from the roll and restraining pressure is released from the coils. Insulation with decreased but still effective results can be achieved by two or more foil layers without flaps wherein the surfaces thereof are in direct contact. This is true because the molecules of the separate layers are not truly fused together, necessarily implying at least some thermal resistivity. For this mode, different materials of foil would be more effective.

A multiplicity or combination of these layers of foil, including types of separation means and types of materials, may be used depending upon the thermal protection desired and conditions encountered. As aerodynamic forces increase, the flaps and/or coils are compressed somewhat. However, some space (void) is necessarily left between the surfaces thereby affording a very efficient thermal insulation, especially under vacuum conditions. If the foil itself, and its flaps 18 or coils 17, are made of heat-resisting metal, there can be no effective thermal short in the system. The metallic layers of foil, with resultant dead spaces (in vacuum) between the foil and the primary substrate (spacecraft) material, produce a system which significantly reduces the conduction and convection to the substrate material of a high temperature environment by any gas or fluid.

The foil layers may be of any of the following configurations depending on thermal protection desired:
1. Plain, smooth foil.
2. Quilted foil.
3. Multiple layers of 1 and/or 2.
4. Plain, smooth foil with flaps 18 and/or coils 17.
5. Quilted foil with flaps 18 and/or coils 17.
6. Multiple layers of combinations of 1, 2, 4, and 5.
7. Combinations of 1, 2, 4, and/or 5.
8. Any of the above configurations with a layer of insulating material, such as asbestos, between them.

The thickness of all materials is dependent upon thermal and mechanical protection required.

In the detailed description which follows, elements in the various drawings having the same or similar function have been given the same reference designator in some instances.

Refer now to FIG. 1 where side elevation views of various possible forms of this invention are shown. (For ease of illustration, deployment means have been omitted in these views.) FIG. 1a is simply a layer of foil 10, which may be smooth or quilted, deployed over the surface to be protected 11. FIG. 1b shows multiple layers of smooth or quilted foil 12, 14 with a layer of insulating material 13 between them. FIG. 1c shows two layers: (1) a top layer 15 of smooth or quilted foil and (2) a bottom layer 16 with self-actuating coil elements 17 on one side and flaps 18, actuated by aerodynamic forces (i.e., the turbulence caused by the windstream) on the other side. In this configuration, the foil layer 16 next to the spacecraft skin 11 would be deployed first from it supply roll, followed by 19, 20 containing coil elements 17 one on top of the other. It will be appreciated that an infinite number of arrangements and layer elements are possible and FIG. 1 is by way of illustration only and not limitation. It will be noted that there is no mechanical or thermal bond between the layer elements 10, 12, 14, 15, 16, 19, or 20 and the spacecraft skin 11.

The flap elements 18 of the foil layers may consist of simply a plurality of two-dimensional controlled "tears" (i.e., rips) punched in the foil (see FIG. 6) or may be separate flap elements bonded or welded, on the trailing edge, to the foil layers. The latter form is preferable from a strength and operational standpoint, however, the former method is cheaper to produce and lighter in weight.

Figure 1C:
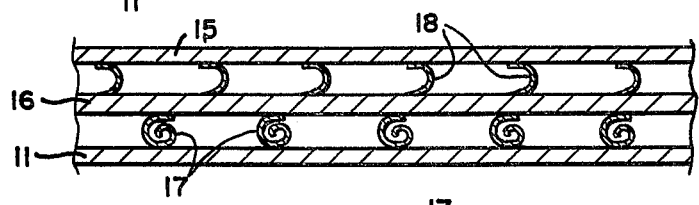
Figure 1D:
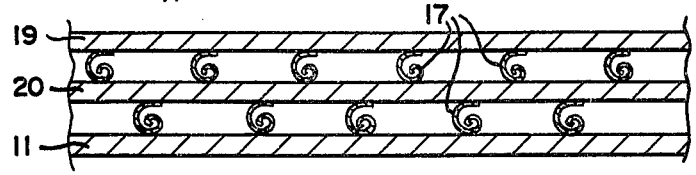

The coiled elements 17 are strips extending substantially over the width of the foil 19, 20 etc. and are "prestressed" such that their static or "resting" mode is coiled up, such as in a spring (see FIGS. 1c, 1d and 6). When the foil 19, 20 etc. is rolled up for stowage (prior to deployment) the coil elements 17 are uncoiled and forced to lie smoothly superposed on the foil 19, 20 etc., thereby making a compact roll (not shown). When the foil 19, 20 etc is allowed to unroll, the coil elements 17 recoil, thereby forming a cushion or raised surface for the next layer of foil to rest upon (see FIG. 1d).

In this thermal protection system there is no direct bond to the substrate material, thus eliminating at least some of the structural and thermal problems. There are two proposed methods of deployment: (1) self-deployment utilizing atmospheric resistance and/or aided by a drogue chute effect, i.e., "pockets" in the trailing edges of the top surface of foil: (2) Mechanical/electrical deployment by means of a track-mounted, motor-driven, pulling scheme.

Referring now to FIG. 2, self-deployment is utilized where the trailing edge 21a of the foil 21 is not secured and is initiated by releasing a brake (not shown) on a roll 22 of foil 21 immediately prior to reentering the atmosphere. As atmosphere is encountered, the top surface of the foil 21 encounters a force acting upon it which pulls the foil 21 and deploys it from the roll 22. Pockets may be built into the trailing edge 21a or top surface of the foil 21 to aid deployment. For some applications, a motor (not shown) mounted to drive the roll 22, may provide a force to "push" the foil 21 from the roll 22 and across the surface to be protected toa point where the atmospheric resistance takes over and completes the deployment. The motor may also be used for rewinding the foil at the end of the critical reentry period. The self-deployment method is useful for surfaces other than leading edges.

Figure 2A:
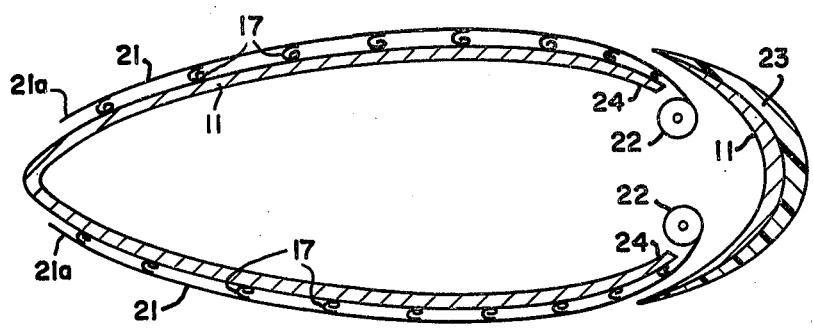
FIGS. 2a—2c illustrates various modes of stowing and deploying the invention over an aerodynamic surface such as a wing.
Figure 2B:
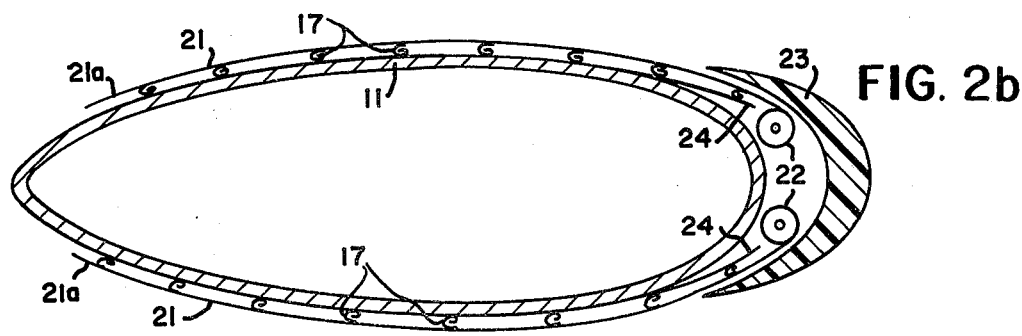
Figure 2C:
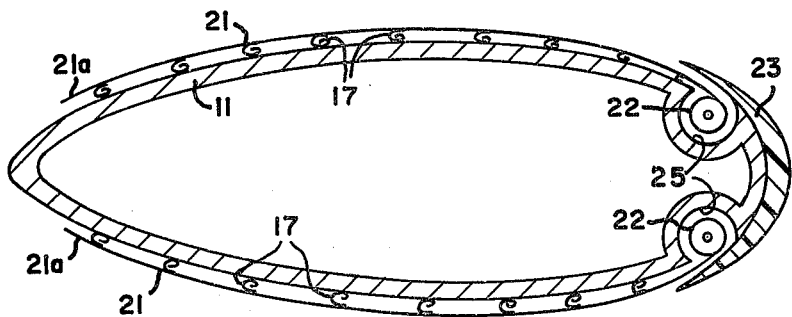

FIGS. 2a, 2b and 2c disclose mounting possibilities for the supply rolls 22 of foil 21 for thermal protection systems (TPS) where another form of TPS 23 is used for the leading edges. FIG. 2a discloses the foil supply rolls 22 mounted within the airframe structure 11 with the foil 21 emerging from under or near the leading edge TPS material 23. FIG. 2b shows the supply rolls 22 mounted between the airframe leading edge and the leading edge TPS material 23. FIG. 2c discloses the supply rolls 22 mounted in notches or grooves 25 in the airframe leading edge thus allowing the leading edge TPS 23 to be mounted closer to the airframe.

When mounted for stowage, the foil 21 is wound on rolls 22 with the flaps 18 and/or coils 17 being extended along the surface of the foil 21 so as to form a compact roll 22. When the foil is deployed, the flaps 18 are exposed to the atmospheric stream, thus causing them to open, i.e., fold back over themselves. It will be appreciated that where the aerodynamically-operated flaps are used, the next succeeding layer of foil must be deployed sequentially, i.e., after the flaps are actuated by the airstream. For the coiled flap 17 configuration, the spring tension effect of the coil 17 causes it to recoil automatically when released from the compression of the roll 22. A guide 24 may be required to keep the coil elements 17 flat until they exit the spacecraft structure. When released from the compression of the roll 22, the flaps 18 or coils 17 then form a cushioned, relatively open space between the spacecraft substrate and the foil layers 21 and/or between individual foil layers. The foil 21 is thus deployed across the substrate to be protected (only when required) and is not in bonded contact with the substrate. The foil layers 21 are held in place by the atmospheric (aerodynamic) pressure during reentry.

Referring now to FIGS. 3, 4, and 5, the driven deployment method may consist of a track-mounted pulling mechanism or takeup reel 30, motor-operated (not shown) which pulls the foil 21 from the supply roll 31, by means of a pull-wire 32 and bridle (not shown) across the surface to be protected with the foil 21 stopping wherever desired. The "take-up" reel 30 provides the pulling force to pull the foil 21 from the supply reel 31. This method is required for any deployment which is to be completed prior to the spacecraft reentering the atmosphere, i.e., where there is no aerodynamic force acting upon the foil, such as for leading edge wraparound. This method is also useful for in-orbit operation where it is desired to protect a surface from solar energy. This would eliminate the necessity of performing the rotisserie maneuvers (now employed to prevent heat build-up) thereby making it possible, for example, to maintain a single spacecraft pointing attitude for long periods of time and thereby conserving fuel. The configurations of FIG. 4 would be used for relatively flat surfaces.

FIG. 5 discloses a configuration for a leading edge plus surface protection system where greater thermal protection is required such as at the leading edge of the spacecraft wing. The second and all successive layers of leading edge foil 26a, 26b, etc., are attached by welding or other bonding means 27 at one end of the multiple layers and is free at the other end 28, thus allowing several layers to be built up as desired.

If it is desired to rewind the foil on the supply reel 31 after the critical reentry period, the guide 24 may serve as a "wiper" to smooth out the coils 17 in order that a compact stowage may be accomplished.

The edges of the foil may be rolled to increase tear resistance.

The width of individual rolls of foil is dependent upon the configuration of the various surfaces. One strip of foil should overlap somewhat with another to decrease aerodynamic drag and turbulence.

In a final embodiment (See FIG. 7), coil elements 17 are disposed between two layers of foil 34, 35 whose peripheral edges 36 have been welded or otherwise bonded in an air tight manner, preferably as the foil and coils are rolled into a compact roll, thereby effectuating a near vacuum between the foil layers 34 and 35. When the roll is deployed, as in FIG. 7, the coil elements recoil in the usual manner as hereinbefore described, thereby forcing the foil layers apart. The result is a pillow-shaped insulation system with a vacuum (and coiled elements 17) between the foil layers 34 and 35. It will be appreciated that the coil elements 17 must have sufficient energy to overcome the differential in pressure between the inner space of the invention and the exterior thereto. In deep space, of course, this differential is near zero.

While the foregoing description has been directed to spacecraft applications for purposes of explanation, it will be appreciated that the invention is also useful in earthly insulation applications such as, for example, in refrigerators, jet engines and buildings. It may likewise be used as a sound insulator.

What I claim is:

1. An environmental protection system for protecting a spacecraft surface from a hostile environment, comprising:
   a. a spacecraft exterior surface to be protected;
   b. a layer of insulating material adapted to be rolled up in a compact roll when not in use; and,
   c. means for deploying said insulating material between said spacecraft surface to be protected and said hostile environment.

2. An environmental protection system for protecting a surface from a hostile environment, comprising:
   a. a layer of insulating material adapted to be rolled up in a compact roll when not in use;
   b. deployment means for deploying said insulating material between said surface to be protected and said hostile environment; and,
   c. aerodynamically-operated flap separation means integral with said insulating material in such manner that said separation means is adapted to be displaced from the plane of said insulating material when said insulating material is unrolled.

3. An environmental protection system for protecting a surface from a hostile environment comprising:
   a. a layer of insulating material adapted to be rolled up in a compact roll when not in use;
   b. deployment means for deploying said insulating material between said surface to be protected and said hostile environment; and,
   c. prestressed, self-actuating coil separation means integral with said insulating material in such manner that said separation means is adapted to be displaced from the plane of said insulating material when said insulating material is unrolled.

4. An environmental protection system for protecting a surface from a hostile environment, comprising:
   a. a plurality of superposed layers of insulating material having their peripheral edges bonded together and adapted to be rolled up in a compact roll when not in use;
   b. deployment means for deploying said insulating material between said surface to be protected and said hostile environment; and,
   c. prestressed, self-actuating coil separation means integral with and disposed between said layers of insulating material in such a manner that said self-actuating coil separation means is adapted to be displaced from the plane of said insulating material when said insulating material is unrolled.

* * * * *